J. A. SCHAUB.
STRAINER FOR GASOLENE AND OTHER LIQUIDS AND HYDROCARBONS.
APPLICATION FILED DEC. 4, 1915.
1,177,277.  Patented Mar. 28, 1916.
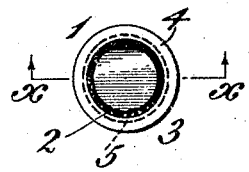
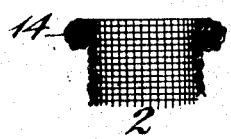 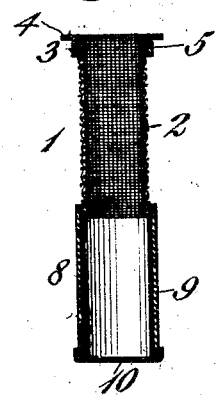 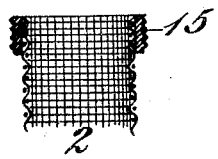
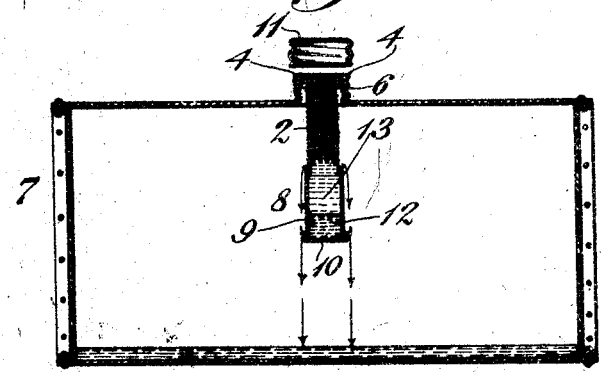
WITNESSES
L. Douville
H. G. Dieterich
INVENTOR
Joseph A. Schaub.
BY Niedersheim
ATTORNEYS

UNITED STATES PATENT OFFICE.

JOSEPH A. SCHAUB, OF LAFAYETTE HILL, PENNSYLVANIA.

STRAINER FOR GASOLENE AND OTHER LIQUIDS AND HYDROCARBONS.

1,177,277.  Specification of Letters Patent.  Patented Mar. 28, 1916.

Application filed December 4, 1915. Serial No. 65,060.

*To all whom it may concern:*

Be it known that I, JOSEPH A. SCHAUB, a citizen of the United States, residing at Lafayette Hill, Montgomery county, State of Pennsylvania, have invented a new and useful Strainer for Gasolene and other Liquids and Hydrocarbons, of which the following is a specification.

It is well known that in the ordinary gasolene of commerce there is frequently entrained a slight amount of water and foreign impurities which it is desirable to remove therefrom prior to conducting the gasolene from the gasolene tank to the carbureter or engine cylinders.

The object of my present invention is to provide a simple, compact and inexpensive appliance which can be cheaply manufactured and readily inserted into any gasolene tank of standard make and which is adapted to not only strain and arrest the impurities which may be in the gasolene but to also trap any water or similar heavier liquid which may be in the gasolene and which may have a deleterious or injurious effect upon the efficiency of the carbureter or the engine cylinders.

To the above ends my invention consists of a novel construction of a gasolene strainer which is provided with an upper annular supporting ring and a lower water collecting trap also an intermediate strainer body, the novel features of which will be hereinafter fully set forth and pointed out in the claims.

My invention further consists in the novel combination of a strainer of the character described with a gasolene tank and its adjuncts.

For the purpose of illustrating my invention, I have shown in the accompanying drawing those forms thereof which are at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a plan view of a strainer for gasolene or other hydrocarbons or liquids embodying my invention. Fig. 2 represents a section on line x—x of Fig. 1. Fig. 3 represents a sectional view of a gasolene tank showing my invention applied thereto or suspended therein. Figs. 4 and 5 represent sectional elevations of other embodiments of my invention.

Similar numerals of reference indicate corresponding parts in the figures.

Referring to the drawings, 1 designates my novel construction of strainer for gasolene or other hydrocarbons and the like, the same comprising a cylinder or strainer body 2 of fine mesh or gauze, which may be cylindrical, oval, rectangular or other shape in cross section, and has secured to its upper end by any desired means an annular, angular flanged ring 3 having the lateral member or flange 4 and the depending flange 5, said ring being adapted to be seated on the threaded neck 6 of the gasolene tank 7.

The lower end of the strainer member 2 is secured in any suitable manner to the upper end of a trap 8, the latter in its simplest embodiment comprising a tube 9 having its lower end closed, as indicated at 10. The manner of using my invention will be understood from Fig. 3, the strainer being shown as dropped into position within the tank and retained suspended within the tank by the contact of the flange 4 with the top of the threaded neck 6, which is engaged by the threaded cap or closure after the filling operation is completed. The cap 11 having been removed, and the gasolene or other hydrocarbon or liquid being introduced under pressure or otherwise into the top of the strainer, any water which may be entrained in the gasolene will drop to the bottom of the trap 8 and assume the position indicated at 12, while the lighter gasolene will occupy the space indicated at 13, and as the filling operation is continued the water entrained in the gasolene will be trapped in the bottom of the trap, while the lighter gasolene will flow through the side walls of the strainer into the tank 7, as indicated by the arrows in Fig. 3. The gasolene which is fed or conducted from the tank 7 to the carbureter in the usual way will therefore be freed from any water entrained therein, as it will be obvious that the trap 8 and its adjuncts can be made of any desired size, according to requirements, so that as a result of the employment of my device, a richer and more efficient explosive charge will be produced for use in the engine cylinder.

It will be understood that the supporting ring 3 may be brazed or otherwise secured to the top of the strainer body 2 in any suitable manner and that the upper extremity of the trap 8 may also be secured to the lower end of the strainer body 2 in any suitable manner.

It will further be apparent that my device can be cheaply manufactured and quickly dropped into position and suspended within any standard gasolene tank upon the removal of the closure or screw cap 11 therefrom, the dimensions of the laterally extending flange 4 being preferably such that when the parts are in the position seen in Fig. 3, the screw cap 11 can be readily screwed into place after the tank is filled.

By the employment of the strainer body 2 and trap 8 collocated in the manner described, it will be apparent that I make provision not only for arresting any sediment or impurities which may be in the gasolene and which cannot pass through the strainer body 2, but I also make provision for arresting in the trap 8 any water which may be entrained in the gasolene, since the lighter gasolene will flow over the upper edges of the trap, as indicated in Fig. 3, whereby the gasolene which is received in the tank 7 will be thoroughly strained and cleansed and will have any water removed therefrom.

While I have designed my device particularly for use in gasolene tanks, it will be understood that so far as the straining operation is concerned, the device may be used with equal facility to strain or purify other liquids or hydrocarbons and will be particularly efficient in such cases as where the liquid to be strained is liable to be commingled with another liquid of a greater specific gravity, which will cause said heavier liquid to sink to the bottom of the trap 8.

It will be apparent that in the broad scope of my invention, it is immaterial in what manner the strainer is supported and the construction at the upper end of the strainer will vary in accordance with the conditions and requirements met with in practice. For example, the upper end of the strainer may have the upper portion thereof folded or bent over in any desired manner to form the bead 14.

In some cases the inlet to the gasolene tank is internally threaded and in such case it is advantageous to provide the upper end of the strainer member 2 with an exteriorly threaded ring 15, as seen in Fig. 5 so that after the strainer is screwed in position the closure or cap for the inlet of the tank may be assembled to cover it.

It will be seen from the foregoing that in accordance with my present invention I provide a strainer having its lower portion provided with an imperforate bottom and imperforate side walls, in order to collect and trap any dirt, water or other foreign material, and the upper portion of the device is perforated or foraminous in order that the gasolene may filter therethrough, it being understood that in my present invention the gasolene is introduced directly into the strainer and thence through the sides of the upper portion thereof, as indicated by the arrows in Fig. 3.

I have, in the present instance, shown and described preferred embodiments thereof which will give in practice satisfactory and reliable results, and it is to be understood that the same are susceptible of modification in various particulars without departing from the spirit or scope of the invention or sacrificing any of its advantages.

Having thus described my invention, what I claim as new and desire to secure by Letters Patent, is:

1. The combination with a gasolene tank having an inlet and a neck surrounding it, of a strainer insertible through said inlet and having its lower walls and its bottom imperforate, and its upper walls foraminous, and having an annular ring connected to its upper walls and provided with a flange to seat on said neck, and a closure for said neck and adapted to engage said ring to secure the strainer in position in the tank.

2. The combination with a gasolene tank having an inlet and a neck surrounding it, of a strainer insertible through said neck and having its lower walls and bottom imperforate, and its upper walls foraminous, and provided at its upper end with means to engage said neck, and a closure for said neck and engaging said means to secure the strainer in position within the tank.

JOSEPH A. SCHAUB.

Witnesses:
H. S. FAIRBANKS,
C. D. McVAY.